Patented Mar. 18, 1952

2,589,683

UNITED STATES PATENT OFFICE 2,589,683

FURFURYL ALCOHOL-AMMONIUM THIOCYANATE-ALDEHYDE RESINS

Andrew P. Dunlop, Riverside, and Paul R. Stout, Chicago, Ill., assignors to The Quaker Oats Company, a corporation of New Jersey No Drawing. Application August 2, 1946, Serial No. 687,976

12 Claims. (Cl. 260—70)

This invention relates to new synthetic thermosetting resins derived from furfuryl alcohol, ammonium thiocyanate and an aldehyde, and to methods of making the same.

The resins of the present invention may be used alone or together with other resinous bodies as solutions for impregnating and laminating purposes, in the preparation of varnishes and other surface coating compositions or for making molded products. In connection with the latter use the resins may be used in conjunction with suitable fillers in molding composition form. The surface coatings are useful as a sealer or finishing coat for table tops of wood and woody materials, and as an impervious, water-repellant coating for ceramics, wall boards, fabrics, etc.

In general, the invention comprises the simultaneous reaction under the influence of heat of furfuryl alcohol, ammonium thiocyanate and an aldehyde to form a water-insoluble, relatively viscous, liquid thermosetting resin. This reaction may be initiated or even brought about by the mere mixing of the reactants, for such mixing generally results in a spontaneous exothermic reaction. In practice, however, it is preferred to carry out the reaction with the aid of additional heat which may be applied to the reactants upon mixing thereof or shortly after the vigor of the spontaneous exothermic reaction has become spent. The application of the additional heat aids in quickly bringing about the formation of a water-insoluble, liquid thermosetting resin which on further heating produces a solid and infusible resin which is resistant to both acidic and basic chemical reagents.

The reaction may be effected in an open vessel, but it is preferred to effect it under reflux conditions. The reaction temperature may be at the reflux temperature of the reactants or it may be at room temperature. Thus, for example, the reaction temperature may vary from, say, about 15 or 20° to 110° C. The time of the reaction may vary widely, from about five minutes to two hours, depending upon the temperature of the reaction and the proportions of the reactants used. In most instances the desired water-insoluble, liquid thermosetting resins are formed in about six minutes to about thirty minutes at reaction temperatures of about 90° to 100° C.

The character of the final infusible resinous products as to flexibility, adhesiveness, strength and hardness can be controlled by varying the quantities of the reactants used within fairly wide limits. Equimolar proportions of the reactants may be used or the proportions may be varied from about one-eighth mole to one mole of ammonium thiocyanate to about one to sixty moles each of the furfuryl alcohol and the aldehyde. In general, excellent results have been secured with equimolar proportions of the reactants and with proportions varying from about one mole of ammonium thiocyanate to about one to thirty moles each of furfuryl alcohol and the aldehyde.

The amount of heat generated by the spontaneous reaction between the reactants depends largely upon the proportions of the reactants and upon the particular aldehyde used in the reaction. Thus, for example, when approximately equimolar proportions of ammonium thiocyanate, furfuryl alcohol and formaldehyde are mixed, a spontaneous reaction sets in which raises the temperature of the mass to about the boiling point. Application of additional heat brings about the formation of the desired water-insoluble liquid resin, which on further heating becomes an infusible solid. Other proportions of these reactants show substantially the same phase changes, though, in general, the initial spontaneous reaction is not so marked. When aldehydes other than formaldehyde are used in the reaction, the amount of heat generated is usually not sufficient to bring the reaction mass to the boiling point. Of these other aldehydes, furfural, for example, shows very little tendency toward spontaneous generation of substantial heat.

Generally, where the spontaneous reaction brought about by mixing the reactants in accordance with the present invention is too vigorous, the reaction can be controlled satisfactorily and conveniently by controlling the rate of addition of the aldehyde to the mixture of ammonium thiocyanate and furfuryl alcohol.

Any aldehyde which has the property of condensing with furfuryl alcohol and ammonium thiocyanate to form resinous materials may be used in accordance with the present invention. The aldehydes may be used as such or in polymerized form. Examples of suitable aldehydes are formaldehyde, paraformaldehyde, trioxymethylene, acetaldehyde, propionaldehyde, butyraldehyde, furfural, glyoxal, furylacrolein, crotonaldehyde, benzaldehyde, etc.

Resins prepared from furfuryl alcohol, ammonium thiocyanate and an aldehyde, through a wide range of proportion of those reactants, have similar characteristics. In general, they are dark colored liquids insoluble or only slightly soluble in water, benzene, ethyl alcohol, amyl alcohol and ethyl acetate. They are, however, soluble in methyl alcohol, furfuryl alcohol, furfural and an acetone-water mixture containing about 40-80 per cent acetone.

In general, the water-insoluble liquid resins of the present invention have good stability at room temperature. The resin formed with the aid of furfural requires neutralization with an alkaline material to impart to it the long shelf life of the resins formed with other aldehydes such as formaldehyde, crotonaldehyde, and furylacrolein, for example.

The following examples illustrate the preparation of resinous products in accordance with the present invention. It is to be understood that the invention is not limited to the specific conditions and details set forth in these illustrative examples. In all the examples parts given are by weight.

*Example 1*

481 parts (6.3 moles) of ammonium thiocyanate and 624 parts (6.3 moles) of furfuryl alcohol were stirred under reflux. 526 parts (6.5 moles) of a 37 per cent formalin solution were added at a rate to maintain the temperature of the mixture at 95°–103° C. for about 25 minutes. The mixture was then cooled and 280 parts of water were removed under vacuum. The resulting liquid resin was soluble in furfuryl alcohol. It had a stroke cure of 50 seconds and a solids yield of 65 per cent.

The solids yield is determined by heating five to ten grams of the resins in an oven at 180°–200° C. for about 16 hours. The weight of the cured product so obtained, divided by the weight of reactants in the sample heated (excluding solvents such as water), gives the solids yield.

The stroke cure has been defined as the time required for a resin to convert from a fusible or liquid condition at a definite temperature while being stroked with a spatula to a condition at which the spatula either no longer sticks to the resin or slides over it with relative ease. In practice about 2 cc. of the resin is placed on a hot plate, the temperature of which is adjusted to 145°–150° C., and stroked (approximately 90–100 strokes per minute) with the flat side of a spatula to smooth the resin into a square 2 to 3 inches on a side. The time in seconds for the volatiles to evaporate, for the resin to start to become stringy or gummy and the cure time are recorded.

*Example 2*

175 parts (2.3 moles) of ammonium thiocyanate and 902 parts (9.2 moles) of furfuryl alcohol were stirred under reflux. 745 parts (9.2 moles) of a 37 per cent formalin solution were added at a rate sufficient to bring the temperature of the mixture to about 90° C. and keep it there. After a total of 50 minutes the temperature of the mixture had dropped to 65° C. and it was then cooled to room temperature. 412 parts of water were removed under vacuum. The resulting resin was a thick liquid soluble in furfuryl alcohol. It had a stroke cure of 35 seconds and a solids yield of 72 per cent.

*Example 3*

33 parts (0.43 mole) of ammonium thiocyanate, 1237 parts (12.7 moles) of furfuryl alcohol and 1030 parts (12.7 moles) of a 37 per cent formalin solution were heated under reflux for 1½ hours at a temperature of 85°–105° C., and then 570 parts of water were removed under vacuum. The resulting liquid resin was soluble in furfuryl alcohol, methylcyclohexanone and acetone. It had a stroke cure of 75 seconds and a solids yield of 62 per cent.

A varnish was prepared from this resin using 100 parts of the resin, 122 parts of methyl alcohol and 1 part of maleic anhydride as the curing catalyst. Films from this varnish were cured on glass, steel and woody material and the resulting films were tested. These tests showed that the films were substantially unaffected by concentrated ammonium hydroxide, solid sodium hydroxide, a 10 per cent sodium hydroxide solution or by furfural. Laminated panels formed with this varnish showed good mechanical strength, relatively high specific gravity and relatively low water absorption when tested by standard procedures.

*Example 4*

A mixture consisting of 7.6 parts (0.1 mole) of ammonium thiocyanate, 19.6 parts (0.2 mole) of furfuryl alcohol, and 19.2 parts (0.2 mole) of furfural plus 20 parts of water to reduce the refluxing temperature, was refluxed for 20 minutes. The pH was then adjusted to about 7 with a sodium carbonate solution and the mixture was dehydrated under vacuum to yield a thick liquid resin having a stroke cure of 35 seconds and a solids yield of 67 per cent.

*Example 5*

A mixture consisting of 7.6 parts (0.1 mole) ammonium thiocyanate, 19.6 parts (0.2 mole) furfuryl alcohol, 14.0 parts (0.2 mole) crotonaldehyde and 20 parts of water was refluxed for 10 minutes. After dehydrating the mixture under vacuum a thick liquid resin was obtained. The stroke cure of this resin was 1 minute, and the solids yield was 74 per cent.

*Example 6*

A mixture of 7.6 parts (0.1 mole) of ammonium thiocyanate, 19.6 parts (0.2 mole) of furfuryl alcohol, and 24.4 parts (0.2 mole) of crude furylacrolein was refluxed for 10 minutes to give a thick liquid resin with a stroke cure of 20 seconds, and a solids yield of 79 per cent.

The crude furylacrolein used in this example was prepared by adding, to a solution of 560 parts of sodium hydroxide in 25,600 parts of water, a mixture of 7600 parts of furfural and 3640 parts of acetaldehyde. The aqueous mixture was maintained at 5° C., and the aldehyde mixture was added with stirring over a period of six hours. After standing overnight, the mixture was adjusted to pH 7 with sulfuric acid. The crude furyl-acrolein was separated from the aqueous layer and washed twice with 7500 parts of water.

*Example 7*

A mixture of 15.2 parts (0.2 mole) of ammonium thiocyanate, 39.2 parts (0.4 mole) of furfuryl alcohol and 37.6 parts (0.2 mole) of a 31 per cent glyoxal solution was refluxed for 20 minutes, to give a two-phase system in which the lower layer was a thick liquid resin. This resin was cured on a hot plate at 150° C. with a solids yield of 69 per cent.

In general, the resins prepared in accordance with the present invention cure rapidly at temperatures of about 150° to 175° C. without added curing catalysts. Curing catalysts such as hexamethylenetetramine do not appear to increase the rate of curing to any appreciable extent.

These resins generally mold satisfactorily at about the foregoing curing temperatures and usually maintain a hot flexibility for about 1 to 3 minutes. Thereafter they become rigid and infusible.

We claim:

1. A water-insoluble, viscous liquid thermosetting resinous composition comprising the heat convertible condensation product obtained by heating simultaneously a mixture of furfuryl alcohol, ammonium thiocyanate and an aldehyde.

2. A water-insoluble, viscous liquid thermosetting resinous composition comprising the heat convertible condensation product obtained by heating simultaneously a mixture of furfuryl alcohol, ammonium thiocyanate and formaldehyde.

3. A water-insoluble, viscous liquid thermosetting resinous composition comprising the heat convertible condensation product obtained by heating simultaneously furfuryl alcohol, ammonium thiocyanate and furfural.

4. A water-insoluble, viscous liquid thermosetting resinous composition comprising the heat convertible condensation product obtained by heating simultaneously furfuryl alcohol, ammonium thiocyanate and furylacrolein.

5. A water-insoluble, viscous liquid thermosetting resinous composition comprising the heat convertible condensation product obtained by heating simultaneously furfuryl alcohol, ammonium thiocyanate and glyoxal.

6. The method of producing a water-insoluble, viscous liquid thermosetting resin comprising heating simultaneously a mixture of reactants consisting essentially of furfuryl alcohol, ammonium thiocyanate and an aldehyde until said resin is produced.

7. The method of producing a water-insoluble, viscous liquid thermosetting resin comprising heating simultaneously under reflux a mixture of reactants consisting essentially of furfuryl alcohol, ammonium thiocyanate and formaldehyde until said resin is produced.

8. The method of producing a water-insoluble, viscous liquid thermosetting resin comprising heating simultaneously a mixture of reactants consisting essentially of furfuryl alcohol, ammonium thiocyanate and furfural at refluxing temperature until said resin is produced.

9. The method of producing a water-insoluble, viscous liquid thermosetting resin comprising heating simultaneously a mixture of reactants consisting essentially of furfuryl alcohol, ammonium thiocyanate and furylacrolein at refluxing temperature until said resin is produced.

10. The method of producing a water-insoluble, viscous liquid thermosetting resin comprising heating simultaneously a mixture of reactants consisting essentially of furfuryl alcohol, ammonium thiocyanate and glyoxal at refluxing temperature until said resin is produced.

11. The method of producing a water-insoluble, viscous liquid thermosetting resin which comprises heating simultaneously a mixture of furfuryl alcohol and ammonium thiocyanate with formaldehyde until said resin is produced.

12. The method of producing a water-insoluble, viscous liquid thermosetting resin which comprises adding formaldehyde to a mixture of furfuryl alcohol and ammonium thiocyanate and maintaining the reaction mass at an elevated temperature below about 110° C. until said resin is produced.

ANDREW P. DUNLOP.
PAUL R. STOUT.

REFERENCES CITED

The following references are of record in the file of this patent:

UNITED STATES PATENTS

| Number | Name | Date |
|---|---|---|
| 1,665,237 | Trickey | Apr. 10, 1928 |
| 2,306,924 | Zerweck | Dec. 29, 1942 |
| 2,343,972 | Harvey | Mar. 14, 1944 |
| 2,343,973 | Harvey | Mar. 14, 1944 |
| 2,345,966 | Fiedler | Apr. 4, 1944 |
| 2,368,426 | Root | Jan. 30, 1945 |
| 2,383,793 | Harvey | Aug. 28, 1945 |
| 2,526,643 | Dunlop | Oct. 24, 1950 |
| 2,526,644 | Dunlop | Oct. 24, 1950 |